United States Patent [19]
Henkel et al.

[11] Patent Number: 6,131,944
[45] Date of Patent: Oct. 17, 2000

[54] AIRBAG DEVICE FOR A MOTOR VEHICLE AND METHOD OF MAKING SAME

[75] Inventors: Joerg Henkel, Goeppingen; Manfred Mueller, Deizisau; Harald Rudolf, Tuebingen; H.-Dieter Wiesner, Schwaebisch Gmuend; Wolfgang Disam, Durlangen, all of Germany

[73] Assignees: DaimlerChrysler AG, Stuttgart; TRW Occupant Restraint Systems GmbH, Alfdorf, both of Germany

[21] Appl. No.: 09/275,777

[22] Filed: Mar. 25, 1999

[30] Foreign Application Priority Data

Mar. 25, 1998 [DE] Germany .......................... 198 13 054

[51] Int. Cl.$^7$ .................................................. B60R 21/20
[52] U.S. Cl. ........................................ 280/728.3; 280/732
[58] Field of Search .............................. 280/728.2, 728.3, 280/732, 731

[56] References Cited

U.S. PATENT DOCUMENTS

| 5,013,064 | 5/1991 | Miller et al. ............................. 280/730 |
| 5,222,760 | 6/1993 | Rafferty ................................... 280/728 |
| 5,242,192 | 9/1993 | Prescaro et al. ........................ 280/730 |

FOREIGN PATENT DOCUMENTS

| 0397154B1 | 11/1990 | European Pat. Off. . |
| 3910337C2 | 10/1989 | Germany . |
| 19631556C1 | 2/1998 | Germany . |
| 9-240410 | 9/1997 | Japan . |

*Primary Examiner*—Paul N. Dickson
*Assistant Examiner*—Faye M. Fleming
*Attorney, Agent, or Firm*—Evenson, McKeown, Edwards & Lenahan, P.L.L.C.

[57] ABSTRACT

An airbag device for motor vehicles has a housing in which an airbag expandable through a housing opening is located. The housing opening is covered by a flexible protective cover in the resting state of the airbag. The cover is provided with at least one tearing location. The cover flanks the airbag on all sides over at least a portion of its expansion path during expansion. The protective cover is provided with at least two tearing locations offset with respect to one another in the expansion direction such that the protective cover tears open in stages during the expansion of the airbag.

16 Claims, 2 Drawing Sheets

AIRBAG DEVICE FOR A MOTOR VEHICLE AND METHOD OF MAKING SAME

BACKGROUND AND SUMMARY OF THE INVENTION

This application claims the priority of German application 198 13 054.6-21, filed Mar. 25, 1998.

The invention relates to an airbag device for a motor vehicle with a housing in which an airbag that can be expanded suddenly through a housing opening is located. The housing opening is covered by a flexible protective cover when the airbag is in the resting state, said cover being provided with at least one tearing location, with the protective covering being so designed that it covers the airbag on all sides over at least a portion of its travel during expansion.

An airbag device of this kind is known from German Patent 39 10 337 C2, in which the airbag is stored in a housing, with two restraining tabs being fastened in each side of the housing. In the resting state of the airbag, these tabs are folded in the vicinity of the outlet opening over the latter. When the airbag expands, the restraining tabs are knocked out, so that they uncover the sides of the outlet opening opposite one another and thus are intended to avoid damage to the airbag during expansion.

In addition, an airbag device is known from European Patent Document EP 0 397 154 B1 for a motor vehicle. In this document, a housing of an airbag that can be inflated suddenly is sealed by a flexible protective cover made essentially in the form of a flexible cushion element made of plastic. The cushion element is permanently connected along its edge with a rigid frame and has a specified breaking location in the middle, where the cushion element is divided into two parts when the airbag inflates. These parts are pivotable laterally away from the direction of movement of the airbag.

An airbag device with an inflatable airbag is known from German Patent 196 31 556 C1, with a guide tube associated with the airbag. The guide tube is attached so that it cannot be lost, by an annular fastening area at one end to a housing of the airbag device or directly to the airbag itself. At the other end, it has a seam that is closed in the resting position and serves as a tearing location. The guide tube surrounds the airbag on all sides and in the resting position is folded around the airbag and/or the housing. When the airbag is inflated, the guide tube stretches and forms a firing channel in which the airbag expands. In the course of the expansion, the airbag tears the seam open at the end of the guide tube and emerges from the tube.

A goal of the invention is to provide an airbag device of the type recited at the outset which permits a uniform expansion of the airbag as well as improved protection against damage during the expansion of the airbag.

This goal is achieved according to the invention by the fact that the flexible protective cover is provided with two different tearing locations which are offset with respect to one another in the expansion direction in such fashion that the protective cover tears open in stages as the airbag expands. The tearing open of the tearing locations thus achieved is staggered in both time and space, producing a uniform extension rate of the airbag during the expansion, so that the load imposed on the occupant who comes in contact with the expanding airbag is minimized, especially in the initial phase of the expansion process. Furthermore, the protective cover forms a funnel- or tube-shaped guide for the airbag which prevents the airbag from snagging on parts or being braked by friction during expansion. Finally, the protective cover, by flanking the airbag at least partially on all sides, ensures that the airbag will not be damaged as it passes through the housing opening.

In an embodiment of the invention, the protective cover has an inner and an outer flat structure that are fastened at least approximately at right angles and offset with respect to one another at mounting positions on the housing that are opposite one another, with the inner flat structure covering the housing opening and being provided with a central tearing location in the form of a first tearing line, and with the outer flat structure being secured to fastening points that are offset at approximately right angles with respect to the fastening locations on the inner flat structure, having a second tearing line in a central area, and being stored folded in zigzag fashion in at least three layers. As a result, tearing open of the protective cover in stages during expansion of the airbag in an especially simple fashion is reliably guaranteed. The protective cover is divided by tearing lines, preferably aligned at right angles to one another, into at least four flat sections that are secured by one side to the housing, said sections overlapping the marginal area of the housing opening and largely covering the latter.

In another embodiment of the invention, a plurality of layers folded zigzag fashion are connected with one another by at least one fastening element. The fastening element, which can be made in particular as tearing threads sewn into a tearing seam, is either destroyed or pulled out of the protective cover during the expansion of the airbag, with the movement of the expanding airbag being braked in a deliberate and definable fashion.

In another embodiment of the invention, the outer and inner flat structures are integrated in a common material section, with the outer flat structure being folded at right angles to the inner flat structure. As a result, the entire protective cover can be manufactured in simple fashion from a material web so that the outer and inner flat structures can be aligned reliably and accurately with respect to one another.

Other objects, advantages and novel features of the present invention will become apparent from the following detailed description of the invention when considered in conjunction with the accompanying drawings.

DETAILED DESCRIPTION OF THE DRAWINGS

Figure 1:
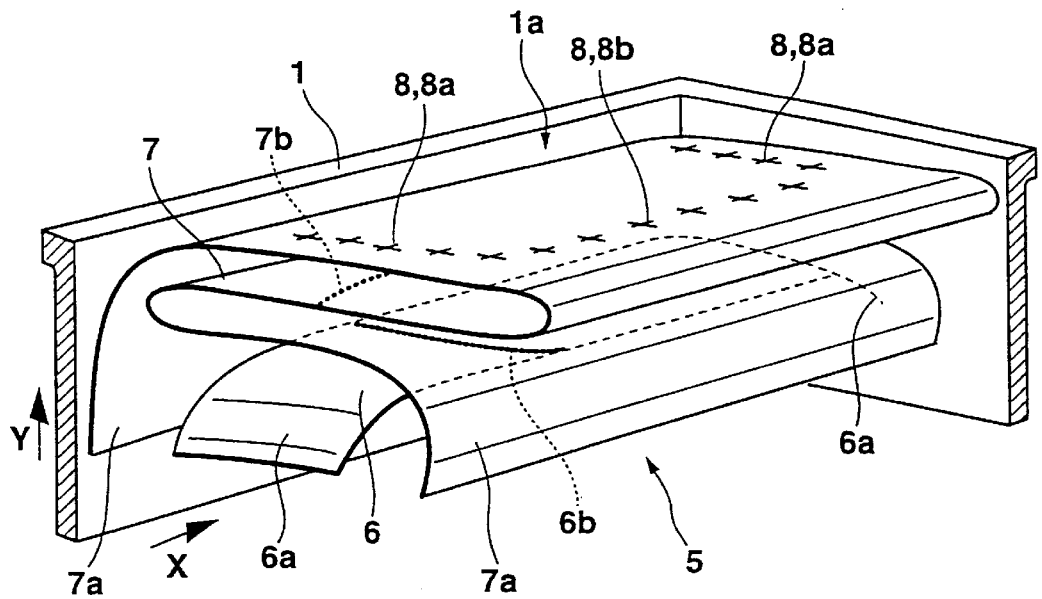
FIG. 1 shows schematically in a perspective view, a housing of an airbag device according to the invention that has been cut open, with a protective cover in the vicinity of a housing opening at the front.
Figures 2A, 2B, 2C:
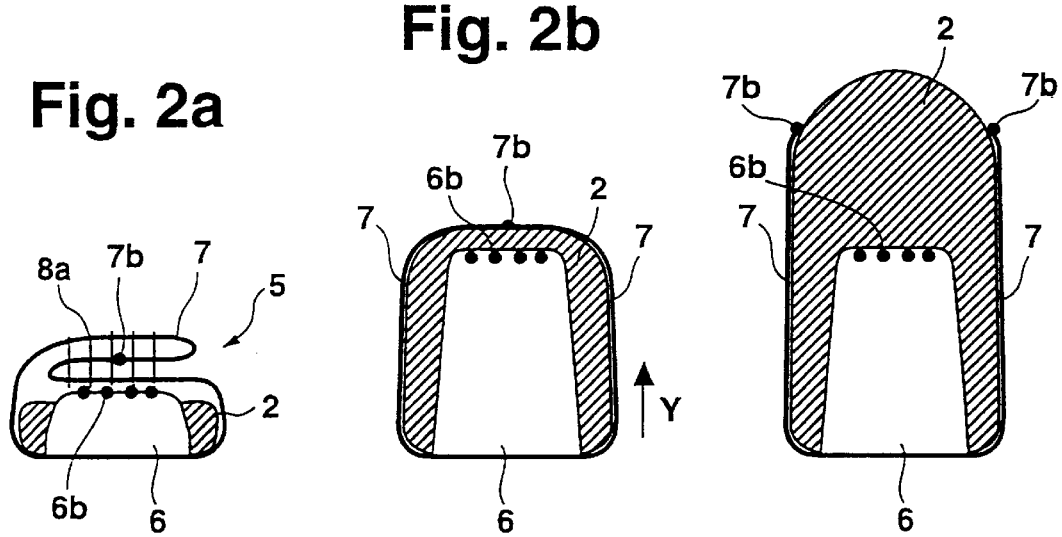
FIGS. 2a to 2c show, in several side views looking in the direction of arrow X in FIG. 1, the functional principle of the airbag device according to the invention during the expansion of the airbag.
Figure 3:
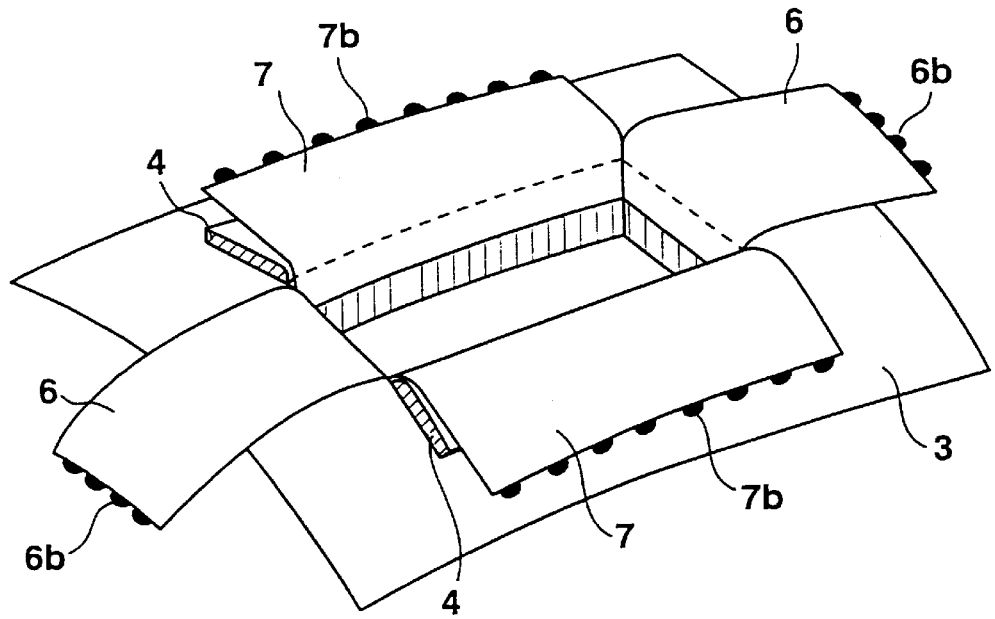
FIG. 3 shows in a perspective view the front of the housing according to FIG. 1 following the expansion of the airbag, with a housing lid pivoting into an open position and the protective cover being torn open.

FIGS. 1 to 3 show a first embodiment of an airbag device for a motor vehicle. The airbag device has a housing 1 in which an airbag 2 is accommodated in its resting position in the smallest possible space and is folded up. A gas generator, not shown, is associated with airbag 2, said generator being able to pressurize the airbag suddenly with a filling of gas and to inflate it. Housing 1 of the airbag device is made in the form of a passenger airbag assembly, preferably located in an instrument panel of the motor vehicle in such fashion that its front housing opening 1*a* faces the occupants of the motor vehicle. The housing opening 1*a* is sealed in a manner not shown by a lid 4 which can also be designed as an integral part of instrument panel 3. In alternative embodiments, the airbag device can also be accommodated in the form of a driver airbag in the steering wheel of the motor vehicle or in the form of a side impact airbag in the interior trim or in a vehicle seat, or can also assume the function of a protective knee bag or window bag.

In the vicinity of housing opening 1*a* between the airbag that is folded in the resting state and cover 4, a flexible protective covering 5 is provided which essentially covers a housing opening 1*a* and also at least partially overlaps the airbag at its top.

Protective cover 5 has a first, inner flat structure in the form of a material web 6 that covers housing opening 1*a* by abutting the airbag directly in the resting state. Material web 6 is permanently connected with housing 1 at two end areas 6*a* opposite one another, and has a tearing line 6*b* that preferably runs centrally between end areas 6*a* transversely to the material web and serves as a tearing or specified breaking location.

In addition, protective cover 5 comprises a second external flat structure in the form of material web 7. This web 7 covers the housing opening 1*a* transversely to the inner material web 6 and is therefore offset at its end areas 7*a* from the first material web 6, preferably by approximately 90 degrees in this case, in housing 1. The outer material web 7 is also folded in a zigzag folding pattern so that it covers housing opening 1*a* at least partially in three layers. Extending in the transverse direction of outer material web 7 and preferably located in the middle layer of the zigzag fold is a tearing line 7*b* that serves as a tearing location or specified breaking location. This tearing line runs approximately at right angles to tearing line 6*b*. In addition, tearing threads 8 that serve as fastening elements and are sewn to the tearing seams are provided which connect the layers of the zigzag fold with one another. Preferably at least two seams 8*a* are provided that are located opposite one another on the sides of the outer material web 7, said seams also being symmetrical to tearing line 7*b*. In addition, more seams 8*b* located parallel to tearing line 7*b* can be provided.

Fabrics and films of all kinds, especially synthetic-fiber or Kevlar fabrics, plastic films, Tyvek paper, or nonwovens can be used to make material webs 6 and 7. Tearing lines 6*b*, 7*b* can be made in the form of weakened places in the material that can take any form, especially as perforations, reductions in material strength, or partial separations of fibers. Instead of tearing threads 8, any other fastening elements such as rivets, clamps, or adhesion points may be used.

The operation of the airbag device according to the invention is particularly evident from FIGS. 2*a* to 2*c* as follows. In the event of a collision, airbag 2 is moved with the aid of the gas generator, not shown, within a very short time from its folded resting position in the direction of arrow Y (expansion direction) into an inflated functional position, with cover 4, preferably with the aid of the airbag as it expands, being opened or removed from housing opening 1*a*. In the initial phase of the expansion of airbag 2, the airbag strikes the layers of protective covering 5 (FIG. 2*a*). Since the inner material web 6 covers airbag 2 tightly without significant excess material, the expansion of the airbag 2 is initially braked by the inner material web 6. The tearing line 6*b* provided, which must be designed accordingly, fails when there is sufficient pressure from the airbag, so that the bag can continue to expand and presses against the outer material web 7. The force of airbag 2 results in an unfolding of the zigzag folds of the outer material web 7, with the seams 8 tearing open in stages. The expansion of the airbag is braked slightly in a definable manner, with the strength of the threads in seams 8 being below the tear strength of the material of material web 7 in order to avoid destroying the material web.

As can be seen from FIG. 2*b*, the surplus material accommodated in the zigzag fold allows the airbag to expand further, with the bag continuing to be surrounded by outer material web 7. Beginning at a certain degree of expansion of the airbag 2, tear line 7*b* of the outer material web also finally tears, so that airbag 2 is released from protective cover 5.

In the course of the further expansion of the airbag, the parts of the inner and outer material web that are separated from one another are folded outward so that as shown in FIG. 3, the edges of housing 1 and the associated recess originally covered by cover 4 in the instrument panel 3 are uncovered and thus protect the airbag 2, which continues to expand, against damage, for example from the breaking point of cover 4 or the instrument panel 3. The material webs can be secured by an end area in housing 1 to an airbag module or to the instrument panel.

Figure 4:
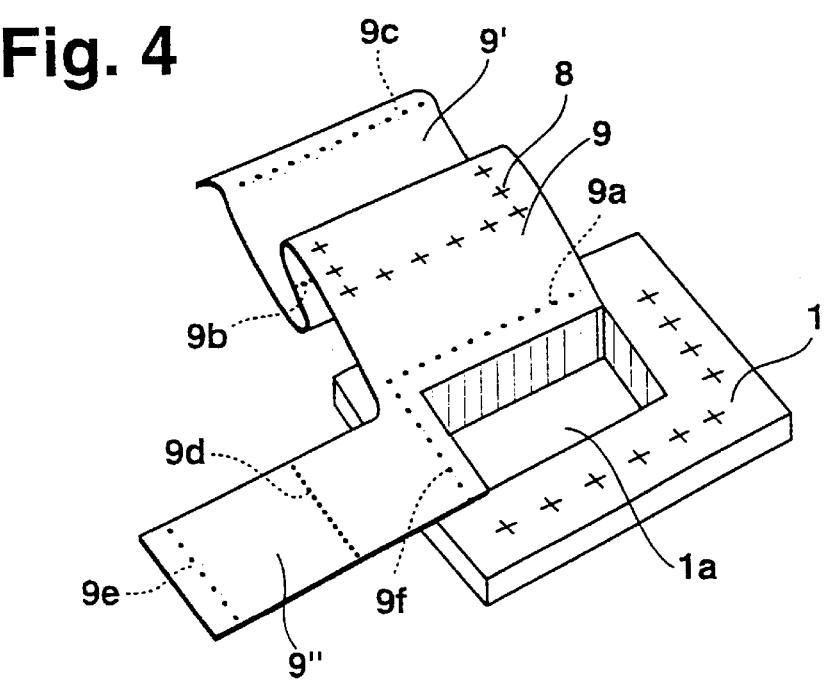
FIG. 4 shows in a perspective view the protective cover of a second embodiment of the airbag device according to the invention.

FIG. 4 shows a second embodiment of the airbag device according to the invention. It differs from the first embodiment mainly in that the internal flat structure 6 and the outer flat structure 7 are made in one piece from a common piece of material 9 and thus are integrated into it. The flat structure thus provided has an essentially L-shaped basic form in which, in the area of the intersection of the two legs 9', 9" the L-shape has a recess cut in it for housing opening 1*a*. The material section 9, which by analogy with the first embodiment has two perforations 9*b*, 9*d* arranged at right angles to one another, each having perforations that extend transversely across one leg of the L-shape, can be secured initially in a L-shaped fastening area 9*a*, 9*f* on the top of housing 1 of the airbag device especially simply with the aid of a plurality of fastening elements such as rivets or clamps. As in the first embodiment according to FIGS. 1 to 3, part 9' of the L-shaped material section 9 has a zigzag fold that preferably encloses the area of a perforation 9*b* as the middle layer and is secured by a plurality of seams 8.

On the basis of the initial assembly position according to FIG. 4, the portion 9", without folding material section 9 around the adjacent fastening area 9*f*, is wrapped over the housing opening 1*a* before the section 9' is then placed over the housing opening 18 with the zigzag fold running transversely with respect to section 9". The protective cover 9 is then secured in an especially simple fashion to the areas 9*c*, 9*e*, with the perforations 9*d* and 9*e* preferably being arranged offset by 90 degrees with respect to one another.

With the aid of the airbag device illustrated by the two embodiments, whose component essential to the invention is the flexible protective cover 5, 9, a type of sliding part for the expanding airbag 2 is created which protects the airbag effectively against damage and also ensures a uniform friction-free expansion of the airbag. In addition, tearing open the protective cover 5, 9 in stages produces an (especially initially) braked expansion of the airbag and thus a uniform rate of expansion. As a result, the safety of the motor vehicle occupants who are in the immediate vicinity of the expanding airbag is increased ("smart restraint"). The guiding function of the protective cover described with respect to FIGS. 1 to 3 and 4 is important for the airbag, as it permits a deliberate expansion into the desired impact area of the human body.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Airbag device for a motor vehicle, with a housing in which an airbag is located that can be expanded suddenly through a housing opening, with the housing opening being covered by a flexible protective cover when the airbag is in the resting state, said cover being provided with at least one tearing location, with the protective cover being so designed that it flanks the airbag on all sides over at least a part of its travel during expansion, wherein the flexible protective cover is provided with at least two different tearing locations which are offset with respect to one another in the expansion direction in such fashion that the protective cover tears open in stages as airbag expands.

2. Airbag device according to claim 1, wherein the at least two different tearing locations are designed as tear lines that run at least approximately at right angles to one another.

3. Airbag device according to claim 1, wherein the protective cover has an inner flat structure and an outer flat structure, which outer flat structure covers the housing opening and is provided with a central tearing location in the form of a first tear line, and with the outer flat structure being secured at fastening points that are offset approximately at right angles to the fastening points of the inner flat structure, said inner flat structure having a second tear line in a central area and being folded zigzag fashion in at least three layers.

4. Airbag device according to claim 2, wherein the protective cover has an inner flat structure and an outer flat structure, which outer flat structure covers the housing opening and is provided with a central tearing location in the form of a first tear line, and with the outer flat structure being secured at fastening points that are offset approximately at right angles to the fastening points of the inner flat structure, said inner flat structure having a second tear line in a central area and being folded zigzag fashion in at least three layers.

5. Airbag device according to claim 3, wherein a plurality of layers of the zigzag fold are connected with one another with the aid of least one fastening element.

6. Airbag device according to claim 4, wherein a plurality of layers of the zigzag fold are connected with one another with the aid of least one fastening element.

7. Airbag device according to claim 3, wherein the outer and inner flat structures are integrated into a common material section, with the outer flat structure being folded at right angles with respect to the inner flat structure.

8. Airbag device according to claim 4, wherein the outer and inner flat structures are integrated into a common material section, with the outer flat structure being folded at right angles with respect to the inner flat structure.

9. Airbag device according to claim 5, wherein the outer and inner flat structures are integrated into a common material section, with the outer flat structure being folded at right angles with respect to the inner flat structure.

10. Airbag device according to claim 6, wherein the outer and inner flat structures are integrated into a common material section, with the outer flat structure being folded at right angles with respect to the inner flat structure.

11. An airbag assembly for a vehicle mounted airbag, comprising:

an airbag housing for holding an airbag in a stowage position, said housing having a housing opening for passage of portions of an expanding airbag during vehicle collision conditions, and a flexible protective cover which in use covers the airbag on its side facing the housing opening, said flexible protective cover being configured to flank the airbag on all sides of the airbag passing through the housing opening during at least a part of the airbag travel during its expansion, wherein the flexible protective cover is provided with at least two different tearing locations which are offset with respect to one another in the expansion direction in such fashion that the protective cover tears open in stages as airbag expands.

12. An airbag assembly according to claim 11, wherein the tearing locations are formed by threads sewn to facing material web sections of the flexible protective cover.

13. A airbag assembly according to claim 11, wherein the at least two different tearing locations are designed as tear lines that run at least approximately at right angles to one another.

14. An airbag assembly according to claim 13, wherein the tearing locations are formed by threads sewn to facing material web sections of the flexible protective cover.

15. A method of making an airbag assembly for a vehicle mounted airbag, comprising:

providing an airbag housing for holding an airbag in a stowage position, said housing having a housing opening for passage of portions of an expanding airbag during vehicle collision conditions, and providing a flexible protective cover which in use covers the airbag on its side facing the housing opening, said flexible protective cover being configured to flank the airbag on all sides of the airbag passing through the housing opening during at least a part of the airbag travel during its expansion, wherein the flexible protective cover is provided with at least two different tearing locations which are offset with respect to one another in the expansion direction in such fashion that the protective cover tears open in stages as airbag expands.

16. A method according to claim 15, wherein the tearing locations are formed by threads sewn to facing material web sections of the flexible protective cover.

* * * * *